United States Patent [19]
Suzuki et al.

[11] Patent Number: 6,053,145
[45] Date of Patent: Apr. 25, 2000

[54] DIRECT INJECTED ENGINE

[75] Inventors: Yuichi Suzuki; Katsumi Ochiai, both of Iwata, Japan

[73] Assignee: Yamaha Hatsudoki Kabushiki Kaisha, Iwata, Japan

[21] Appl. No.: 08/946,184

[22] Filed: Oct. 7, 1997

[30] Foreign Application Priority Data

Oct. 7, 1996 [JP] Japan .................................. 8-266020
Oct. 7, 1996 [JP] Japan .................................. 8-266033

[51] Int. Cl.$^7$ ........................................................ F02B 3/00
[52] U.S. Cl. ........................................... 123/298; 123/301
[58] Field of Search .................................. 123/298, 295, 123/301, 302, 305, 308

[56] References Cited

U.S. PATENT DOCUMENTS

| | | | |
|---|---|---|---|
| 5,709,190 | 1/1998 | Suzuki ..................................... | 123/302 |
| 5,720,253 | 2/1998 | Matoba et al. ........................... | 123/301 |
| 5,799,638 | 9/1998 | Tsuchida et al. ........................ | 123/305 |
| 5,816,215 | 10/1998 | Yoshikawa et al. ..................... | 123/301 |
| 5,878,712 | 3/1999 | Wolters et al. .......................... | 123/305 |

FOREIGN PATENT DOCUMENTS

| | | | |
|---|---|---|---|
| 18623 | 1/1991 | Japan ..................................... | 123/301 |
| 66148 | 3/1994 | Japan ..................................... | 123/301 |
| 123233 | 5/1994 | Japan ..................................... | 123/301 |
| 147022 | 5/1994 | Japan ..................................... | 123/301 |

*Primary Examiner*—John Kwon
*Attorney, Agent, or Firm*—Knobbe, Martens, Olson & Bear LLP

[57] ABSTRACT

A direct cylinder injected internal combustion engine that is effective to provide a stratified stoichiometric mixture at the spark gap at the time of firing and also a homogenous mixture under high speed high load conditions. This is achieved without specially formed bowls in the head of the piston by creating tumble under low speed and lower load conditions and by spraying on the heads of the intake valves during high speed high load conditions to obtain a homogeneous mixture.

27 Claims, 9 Drawing Sheets

DIRECT INJECTED ENGINE

BACKGROUND OF THE INVENTION

This invention relates to an internal combustion engine and more particularly to an improved, direct cylinder injected engine.

In the interest of improving the performance of an engine both in terms of specific output, fuel economy, and exhaust emission control, direct cylinder injection offers significant advantages. One advantage of direct cylinder injection is that if it can be combined with so-called "stratification" the fuel economy and exhaust emission control can be substantially improved.

One difficulty in obtaining optimum fuel economy and exhaust emission control is the problem of initiating combustion in the combustion chamber. Obviously, a stoichiometric charge must be present at the gap of the spark plug at the time of firing or a combustion will not begin.

With conventional engines, in order to ensure the presence of a stoichiometric mixture at the spark plug gap at the time of firing, the entire cylinder is charged with a stoichiometric mixture. This obviously results in the introduction of more fuel than is required to produce the specific output at low and mid-range speeds and loads.

Thus, it has been proposed to employ some form of system wherein the fuel charge is stratified in the combustion chamber, at least under some running conditions. It is not desirable to provide total stratification under all running conditions for a reason which will be described.

In order to provide stratification that is effective, it is necessary to provide at least a patch of fuel air mixture that has a stoichiometric ratio. However, the introduction of such a patch of fuel is only a small part of the problem. It must be ensured that the stoichiometric patch of fuel is present at the spark gap at the time of firing. This must be assured under all running conditions when stratification is desired.

Although certain features may be employed to improve or insure stratification, the charge in the entire combustion chamber should be homogenous when operating at high speeds and high loads. If this is not done, then maximum power cannot be achieved. Many forms of stratification do not permit the attainment of a homogenous mixture at the running conditions where it is desired.

Also, stratification may be achieved through the use of pre-chambers or other devices which significantly complicate the configuration of the combustion chamber and which can reduce performance under some running conditions. For example, many forms of stratified charge engines that employ pre-chambers have high pumping losses.

Added to the problems aforenoted, is the actual physical configuration of the combustion chamber and the layout of those components which are associated with it. If the engine is provided with direct cylinder injection and spark ignition, it is desirable that the spark plug gap be disposed in an area close to the center of the combustion chamber volume at the time of firing. This generally dictates a central positioning of the spark plug in the cylinder head. Where the engine is provided with multiple valves in order to improve performance, then little space is left for the positioning of the fuel injector.

One proposed position for the fuel injector is at a side of the combustion chamber and generally adjacent the intake valves. Frequently, it is desirable to position the fuel injector between the intake valves, as has been proposed in the prior art. However, this greatly complicates the goal of achieving stratification.

Therefore, it has been proposed in engines having a configuration that employs at least a pair of intake valves, a centrally positioned spark plug and a fuel injector at the side of the combustion chamber and between the intake valves, a bowl and piston configuration. Various shapes of bowls have been proposed for the combustion chamber and various arrangements wherein the fuel is sprayed into the bowl and the bowl cooperates in the achievement of stratification. One difficulty with most of these arrangements, if not all of them, is that it is difficult to achieve stratification over a wide range of running conditions. Furthermore, the bowl configuration can result in unburned fuel in the combustion chamber under some running conditions.

It is, therefore, a principal object of this invention to provide an improved direct cylinder injected engine.

It is a still further object of this invention to provide an improved combustion chamber and induction system arrangement for a direct cylinder injection wherein stratification can be achieved without compromising the configuration of the combustion chamber or the location of the components.

It is a yet further object of this invention to provide an improved direct cylinder injected engine utilizing multiple valves, a centrally positioned spark plug and a side mounted injector wherein stratification can be achieved without compromising the configuration of the combustion chamber without requiring complicated bowl and piston designs.

SUMMARY OF THE INVENTION

This invention is adapted to be embodied in a direct injected, internal combustion engine comprised of a cylinder defining a cylinder bore. A piston reciprocates in the cylinder bore. A cylinder head closes one end of the cylinder bore and forms with the cylinder bore and the piston a combustion chamber. The cylinder head is formed with at least a pair of intake ports positioned substantially on one side of a plane containing the axis of the cylinder bore. A pair of intake valves are supported in the cylinder head for controlling the flow through the intake port. The intake ports are served by an intake passage arrangement that terminates at the intake ports. A spark plug is mounted in the cylinder head with its gap disposed substantially at the center of the combustion chamber at top dead center condition. A fuel injector is mounted in an area on the outer periphery of the cylinder bore and disposed at the side of the intake ports for directly injecting fuel into the combustion chamber. Means are provided for directing the fuel sprayed by the fuel injector toward the gap of the spark plug at the time of firing.

BRIEF DESCRIPTION OF THE DRAWINGS

FIGS. 4 through 6 are cross-sectional views taken through one of the valve seats and shows how the valve seat is formed.

DETAILED DESCRIPTION OF THE PREFERRED EMBODIMENTS OF THE INVENTION

Figure 1:
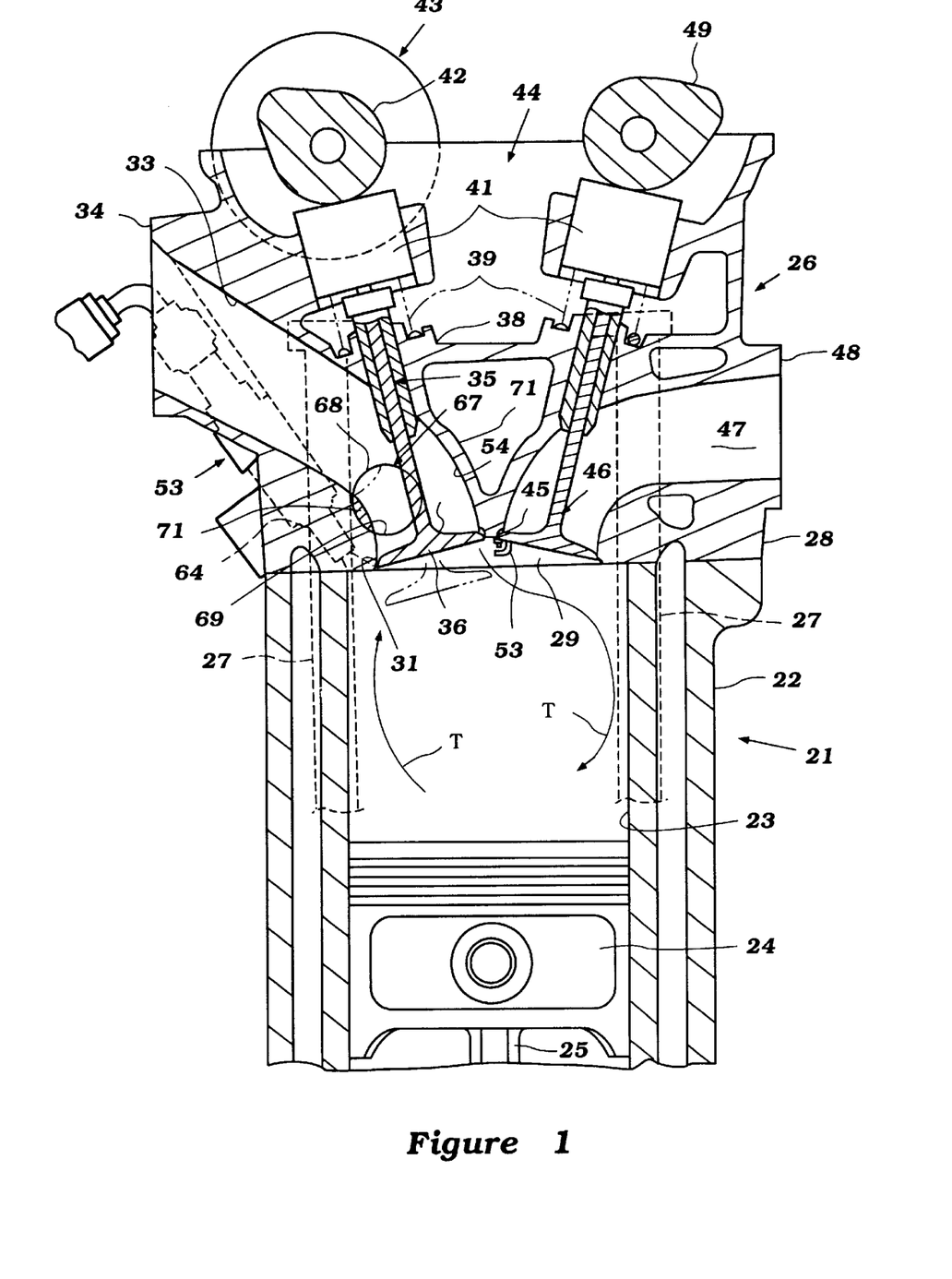
FIG. 1 is a cross-sectional view taken through a single cylinder of a multi-cylinder engine constructed and operated in accordance with an embodiment of the invention.
Figure 2:
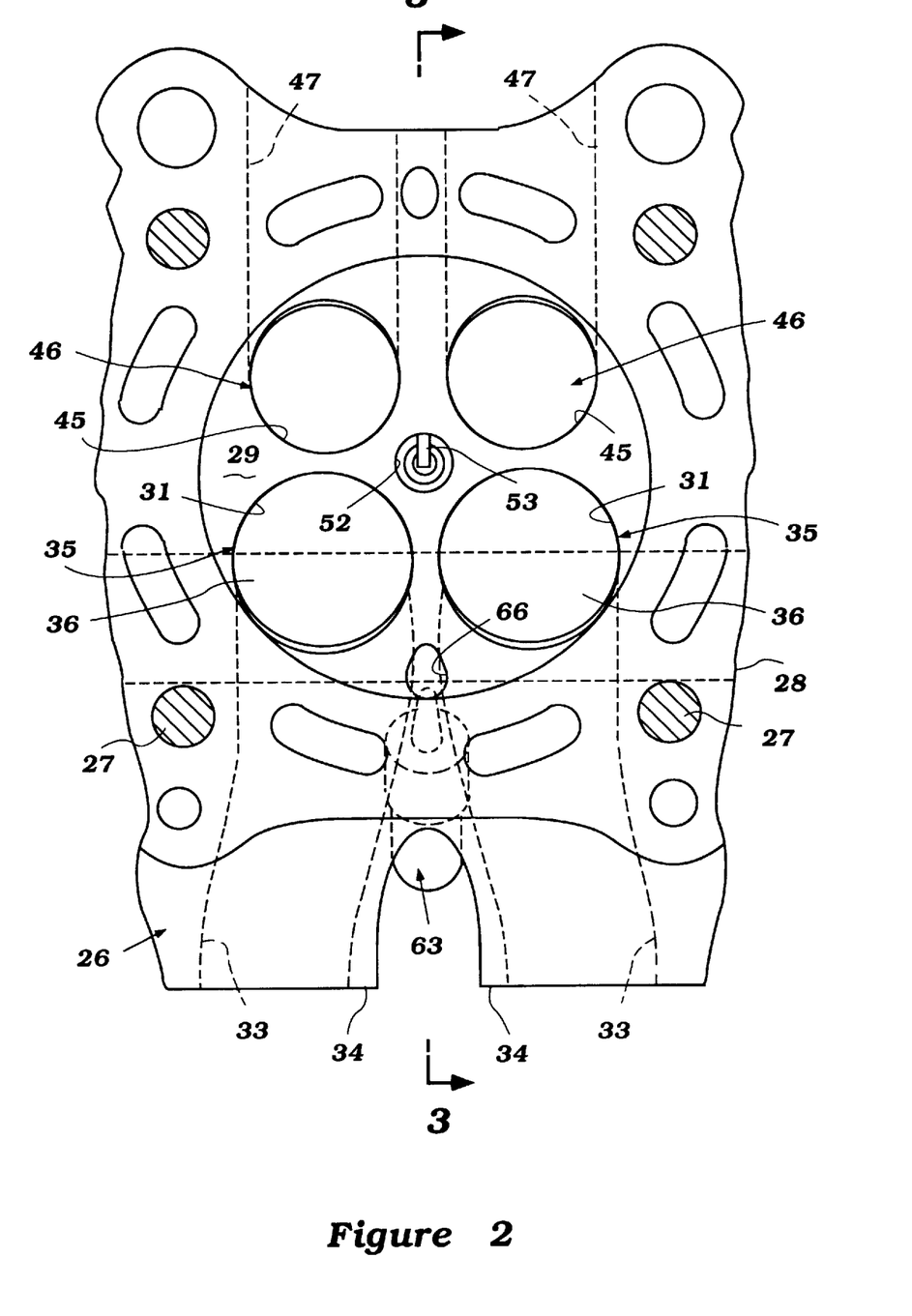
FIG. 2 is a bottom plan view of the cylinder head.
Figure 3:
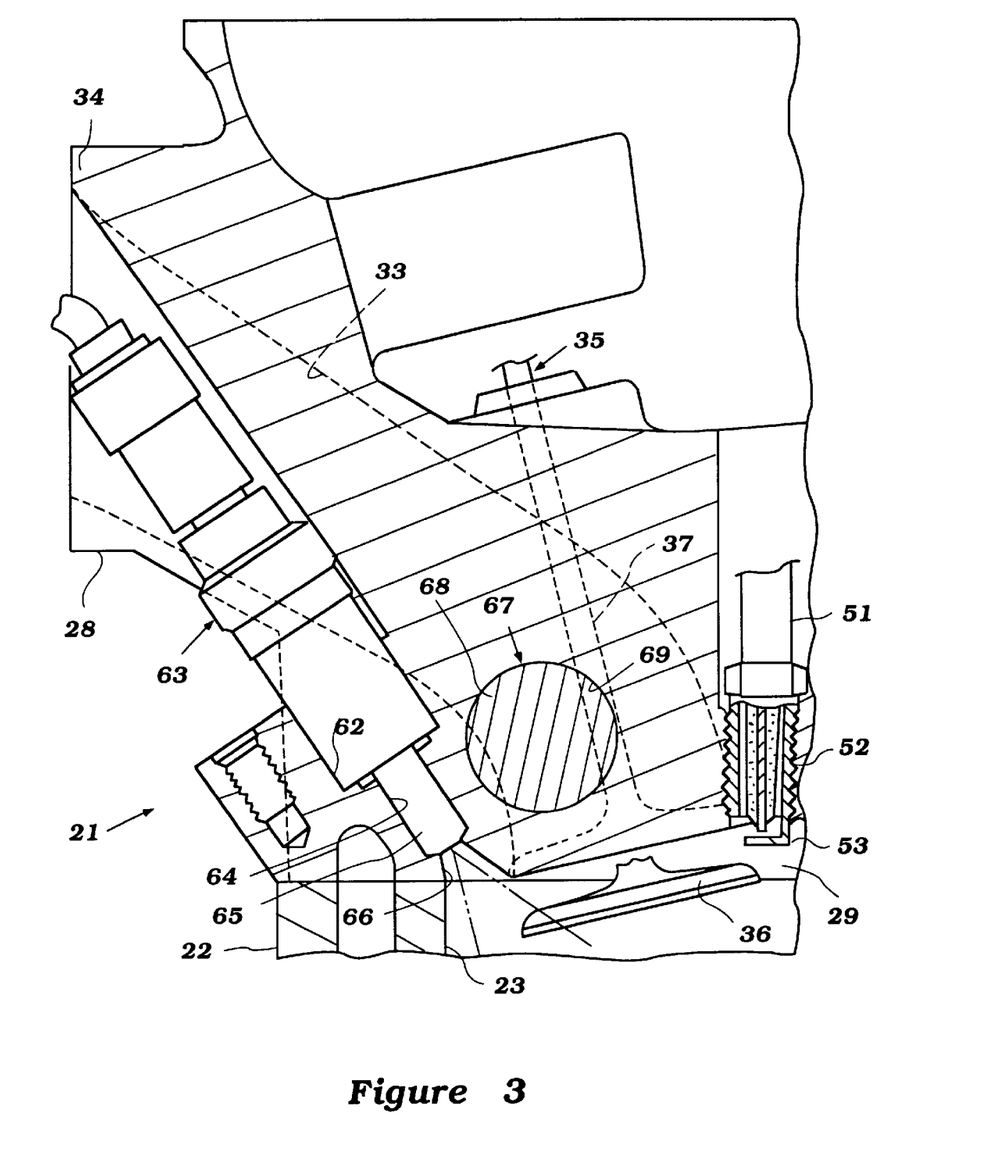
FIG. 3 is an enlarged, partial cross-sectional view taken along the lines 3—3 of FIG. 2 but shows the cylinder head in its upright condition and attached to the cylinder block. This view is taken along a plane parallel to that of FIG. 1.

Referring now in detail to the first embodiment of FIGS. 1 through 12 and initially primarily to FIGS. 1 through 3, an internal combustion engine constructed in accordance with this embodiment is identified generally by the reference numeral 21. The engine 21 is shown only partially and the relationship of the invention to a single cylinder of the engine 21 is depicted. The engine is not shown completely because, as should be apparent from the foregoing description, the invention deals primarily with the combustion chamber, direct fuel injection system and induction system. Thus, where any features of the construction of the engine 21 are lacking, any known construction may be utilized by those skilled in the art from the following description.

Also and for the same reasons, only a single cylinder of the engine has been illustrated. Thus, it is also believed readily within the scope of those skilled in the art to understand how the invention can be employed in conjunction with engines having a wide variety of cylinder numbers and cylinder configurations.

The engine 21 is comprised of a cylinder block 22 which forms one or more cylinder bores 23. Pistons 24 reciprocate in these cylinder bores and are connected by means of connecting rod 25 to drive an associated crankshaft, which is not shown for the reasons already described.

A cylinder head assembly, indicated generally by the reference numeral 26 is attached either detachably through fasteners 27 or formed integrally with the cylinder block 22. This cylinder head assembly 26 includes a main cylinder head member 28. This cylinder head member 28 is formed with individual recesses 29 in its lower surface which cooperate with the cylinder bore 23 and the head of the piston 24 to form the combustion chambers of the engine. At times, the reference numeral 29 will be utilized to designate the combustion chamber since, at top dead center position, the cylinder head recess forms a substantial portion of the clearance volume of the combustion chamber.

The cylinder head 26 is formed with a pair of side-by-side intake valve seats 31 which are formed in a manner that will be described later by reference to FIGS. 4 through 6. These intake valve seats lie substantially on one side of a plane containing the axis of the cylinder bore 23. These intake valve seats 31 are formed at the combustion chamber termination of an intake passage arrangement comprised of a pair of intake passages 32 that extend through the cylinder head member 28 from inlet openings formed in an outer face 34 thereof. A suitable induction system which includes a main throttle control is attached to this cylinder head surface 34 for delivering a charge to the intake passages 33. As will become apparent through the description of the embodiment of FIGS. 13 and 14, the intake passages may be of the Siamese type.

The flow through the intake passages 33 and through the valve seats 31 is controlled by respective poppet type intake valves, indicated generally by the reference numeral 35. The intake valves 35 are preferably formed from Titanium and have valve heads 36 that cooperate with the valve seats 31 in a known manner. In addition, these intake poppet valves 35 have stem portions 37 that are slidably supported in valve guides 38 which are pressed, cast, or otherwise inserted into the main cylinder head member 38.

Each intake valve 35 has associated with it a respective return spring 39 that urges the valve 35 to its closed position through cooperation with a keeper retainer assembly (not shown) that is affixed to the upper end of the valve stem 37. The springs 39 bear against the cylinder head member 28 to close the valves 35 in a manner well-known in the art.

Thimble tappets 41 are mounted in the cylinder head assembly 26 and are operated by the lobes 42 of an intake camshaft, indicated generally by the reference numeral 43. This intake camshaft 43 is driven from the crankshaft of the engine at one-half crankshaft speed by any known type of drive.

The valve actuating assembly thus far described, is contained in major part in a cam chamber indicated generally by the reference numeral 44, formed at the upper end of the cylinder head member 26 and closed by a cam cover (not shown).

On the side of the cylinder head opposite to the exhaust valve seats 31 and specifically of the aforenoted plane containing the axis of the cylinder bore, there are provided a pair of exhaust valve seats 45. These exhaust valve seats 45 are formed in the same manner as the intake valve seats 31. As has been noted, this will be described by reference to FIGS. 4–6.

Poppet-type exhaust valves, indicated generally by the reference numeral 46 cooperate with the valve seats 45 to control the flow through exhaust passages 47 formed in the side of the cylinder head member 48 opposite to the intake passages 31. The exhaust passages 47 terminate in an outer surface 48 of the cylinder head member 46 to which a suitable exhaust manifold and exhaust system is affixed in a known manner. This system operates to discharge the exhaust gases to the atmosphere, as is well known in the art.

The exhaust valves 46 are supported and operated by a mechanism the same as that utilized in conjunction with the intake valves. For that reason, the tappets and valve springs associated with the exhaust valves have been identified by the same reference numerals as applied to those of the intake valves.

An exhaust cam shaft 49 is rotatably journaled in the cylinder head assembly 26 and operates the exhaust valve 46 through their thimble tappets 41 in a well known manner. The exhaust cam shaft is driven in any suitable manner also at one-half crankshaft speed.

It has been mentioned that the intake valve seat 31 is disposed in substantial part on one side of a plane containing the axis of the cylinder bore while the exhaust valve seat 45 are disposed on the opposite side of this plane. It is to be understood, however, that the intake valve seats 41 may extend partially across this plane and that is why they are described as being "substantially" on one side of this plane.

Also, although the invention is described in conjunction with an engine having four valves per cylinder, it may be utilized with engines having other numbers of valves. However, and as will be apparent, the invention has particular utility in conjunction with an engine that has at least two intake ports and two intake valves per cylinder.

A spark plug, indicated generally by the reference numeral 51 is mounted in the cylinder head member 28 in a tapped opening 52 formed therein. This spark plug 51 is positioned so that its spark gap 53 is disposed substantially at the center of the cylinder head recess 29 and, accordingly, substantially the center of the combustion chamber when at its minimum or clearance volume condition. This central location is desirable so as to ensure adequate flame propagation across the entire combustion chamber during the combustion process. The spark plug 51 is fired by a suitable ignition circuit and in accordance with any desired control strategy.

The manner in which the valve seat 31 is formed will now be described by particular reference to FIGS. 4 through 6. As previously noted, the exhaust valve seat 45 may be formed in the same fashion and the following description would apply also to the formation of those valve seats. Although the invention is described in conjunction with a type of valve seat that is formed by a metallurgical bonding technique of a type generally to be described, it should be understood that the invention may also be practiced with engines having conventional valve seats.

However, the use of a bonded type valve seat permits a wider latitude in the shape of the intake passage 33 and particularly in the shape adjacent the valve seat 31, in the area shown in FIG. 1 and identified by the reference numeral 54. This portion of the intake passage 33 is important because its configuration determines the direction of flow into the combustion chamber. As will become apparent as this description proceeds, this flow direction is important in controlling the way in which stratification can be obtained when desired and also permitting homogenous mixture to be formed when desired.

The method by which the valve seat 31 is formed will be described, as noted, by primary reference to FIGS. 4 through 6. The description in which the bonded valve seat is formed is to be considered just one typical way in which such valve seats may be formed. If reference is required for more detail as to potential techniques that can be utilized to enjoy the fullest benefits of the invention, reference may be had to either or both of U.S. Pat. No. 5,586,530, issued Dec. 24, 1996 and entitled "Valve Seat Insert" and/or U.S. Pat. No. 5,649,356, issued Jul. 22, 1997 and entitled "Method of Making a Valve Seat," both of which are assigned to the assignee hereof.

In accordance with this practice, the cylinder head member 28 may be formed from a suitable material and preferably a light alloy casting such as one made from aluminum or aluminum alloys. As may be seen, the intake passage 33 is formed in the basic casting portion and the area 54 terminates in a machined recess 55.

An insert ring, indicated generally by the reference numeral 56 is employed to form the final seating surface for the valve seat 31 and which terminates in a tapered portion 57 that extends slightly outwardly beyond the actual seating surface engaged by the valve heads. This insert ring 56 is formed from an insert ring element 58 that is formed from a sintered iron or the like and which may be impregnated with a material such as copper. A coating formed also from copper or a like material 59 is formed on the outer surface of the insert ring element 58.

Figure 4:
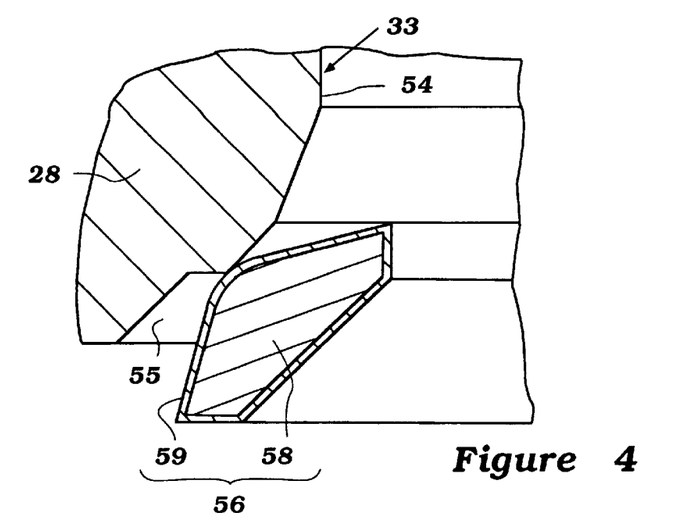
FIG. 4 shows the initial insertion of the valve seat insert.
Figure 5:
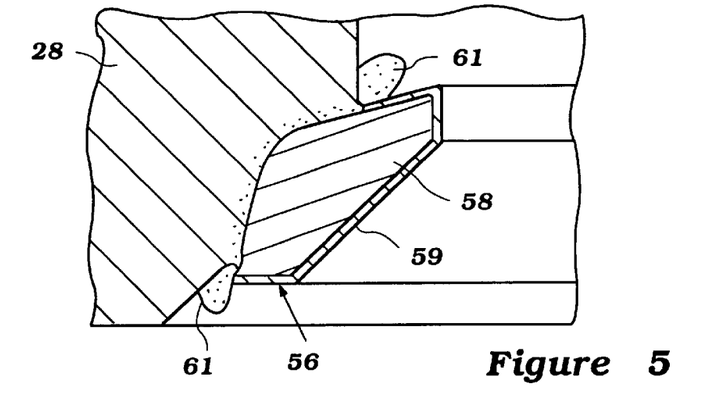
FIG. 5 shows an intermediate step in the bonding process.

The insert ring 56 is then positioned in location centrally of the machined opening 55 as shown in FIG. 4 and pressure is applied. After the pressure is applied, an electrical current is passed through the cylinder head base material 28 and insert ring 56 so as to cause an elevation of temperature. This temperature elevation causes the base cylinder head material 58 to be elastically deformed and when pressed into place in a eutectic alloy 61 is formed that is extruded.

This pressing continues until the ring 56 is embedded in position. At this time, a metallurgical bond is formed between the base cylinder head material 28 and the insert ring material 58. That is, there is no substantial alloying of these two materials at the interface and the metallurgical structure and crystalline structure remains substantially the same. However, there will be some work hardening of the base cylinder head material in this area.

Figure 6:
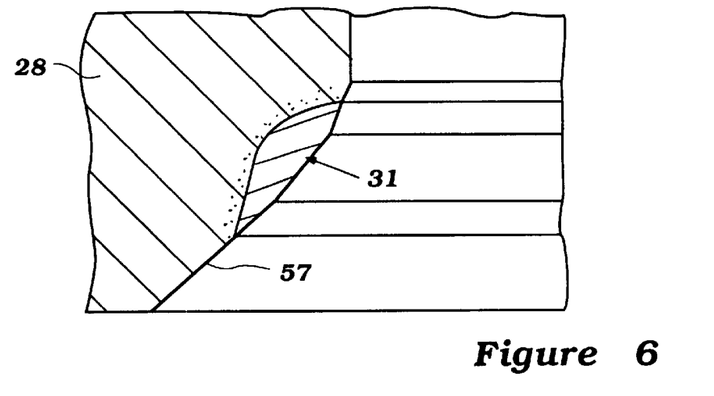
FIG. 6 shows the final valve seat configuration.

The insert ring and cylinder head is then machined to its final configuration as shown in FIG. 6. At this time, the extruded portion 61 which will also include any surface impurities in the base material of the cylinder head 28 will be machined away and removed. Referring now back to FIGS. 1–3, at one side of the cylinder bore 23 on the intake side of the plane containing the aforenoted cylinder bore axis, and, in this embodiment, in the cylinder head there is formed a pocket or recess 62 which is configured to accept the nozzle portion of an injection nozzle 63. This recess or pocket 62 is formed with a channel 64 so as to receive the nozzle portion 65 of the fuel injector. Its tip is recessed into the cylinder head slightly and sprays through a discharge port 66.

Figure 7:
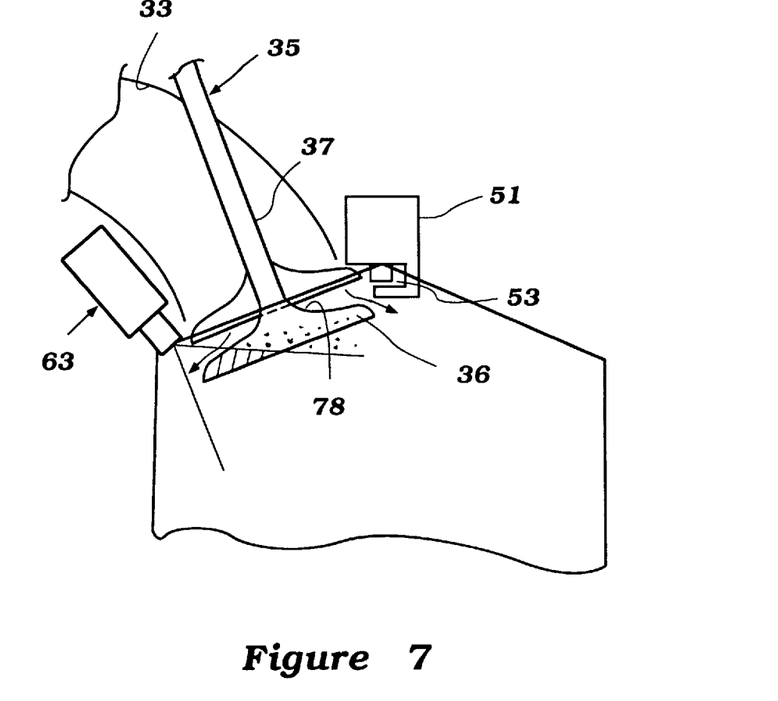
FIG. 7 is a view looking in the same direction as FIG. 1 and in a partially schematic form to show how the fuel injector cooperates with the intake valves to achieve better fuel distribution under some running conditions.
Figure 8:
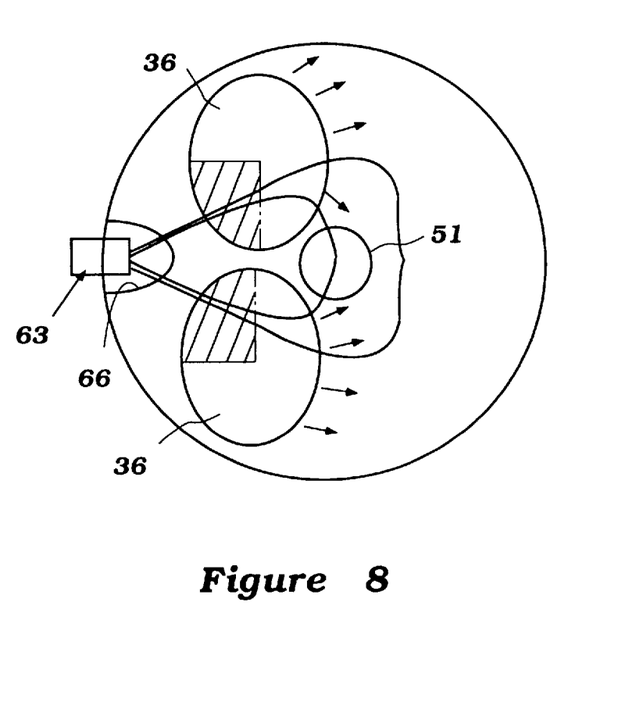
FIG. 8 is a view looking in a direction perpendicular to FIG. 7 and shows how the fuel spray is related to the intake valves during certain running conditions.
Figure 9:
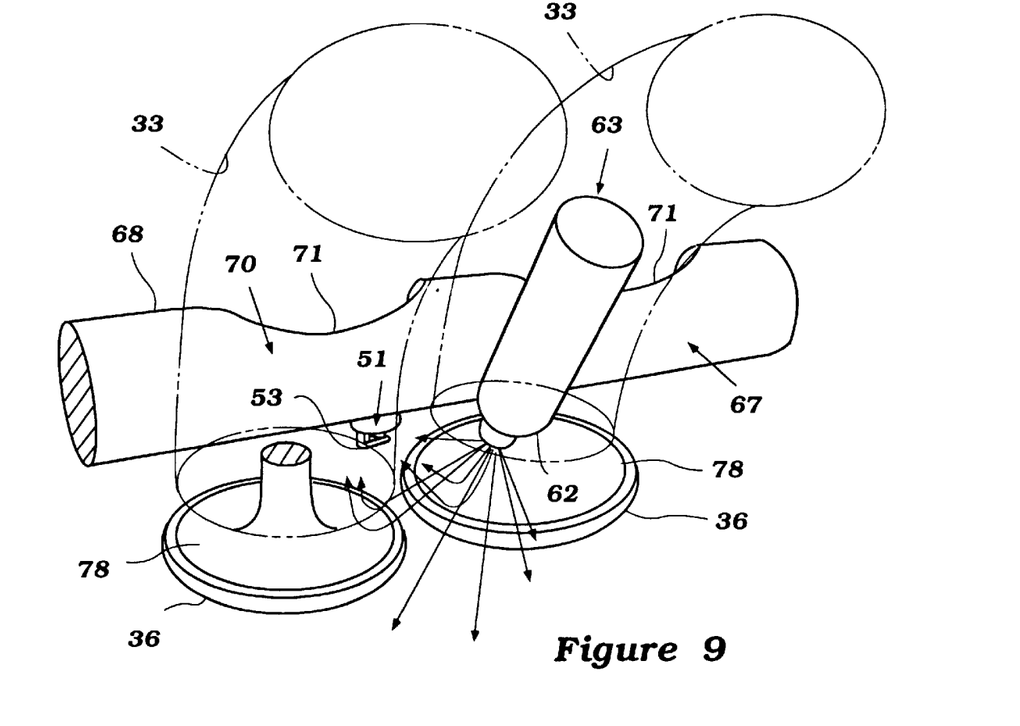
FIG. 9 is a perspective view in partial schematic form showing how the intake valves cooperate with the fuel injector to distribute the fuel and is in part similar to the showing of FIGS. 7 and 8.

As may be seen in FIGS. 8 and 9, the fuel injector 63 is disposed so as to be positioned in the area between the two intake passages 33. The spray pattern is as shown in FIGS. 3 and 7 and is directed generally downwardly into the cylinder bore with a component that extends radially across the cylinder bore. This radially extending portion, however, is not angled sufficiently so as to direct the spray directly toward the spark plug gap 53.

The actual construction of the fuel injector 63 may be of any known type and it preferably is of the electrically actuated solenoid valve type. Fuel is supplied to the fuel injector 63 in any suitable manner and this may include a fuel rail high pressure pump and pressure regulator system.

In accordance with another feature of the invention, there is also provided in the intake passages 33 a tumble valve assembly, indicated generally by the reference numeral 67. This tumble valve assembly 67 is comprised of a generally cylindrical configured valve element 68 that is rotatably journaled in a bore 69 that extends axially along the cylinder head. This valve element 69 is formed with cutout portions 70 as best seen in FIG. 9 which cutout portions form valving portions, indicated by the reference numerals 71.

When the valve assembly 67 is in its opened position as shown in FIG. 1, these valving portions 71 conform to the shape of the intake passage 54 so that they will offer no flow restriction. However, when rotated toward a closed position, in a manner to be described, this valving portion 71 will move into registry with the flow passage 33 and direct the air flow primarily in the direction shown by the arrows T in FIG. 1.

In this position, the intake charge will be directed across the cylinder bore toward the opposite side thereof. The charge then will turn downwardly and be deflected by the head of the piston 24 so as to cause the flow to move upwardly causing a swirl about an axis transverse to that of the cylinder bore 23 which is generally referred to as "tumble." This flow is represented by the arrows "T". This type of swirl is more useful in some instances than the circumferential swirl in that it accelerates as the piston 24 moves toward top dead center position rather than dissipating as with the circumferential swirl.

Figure 10:
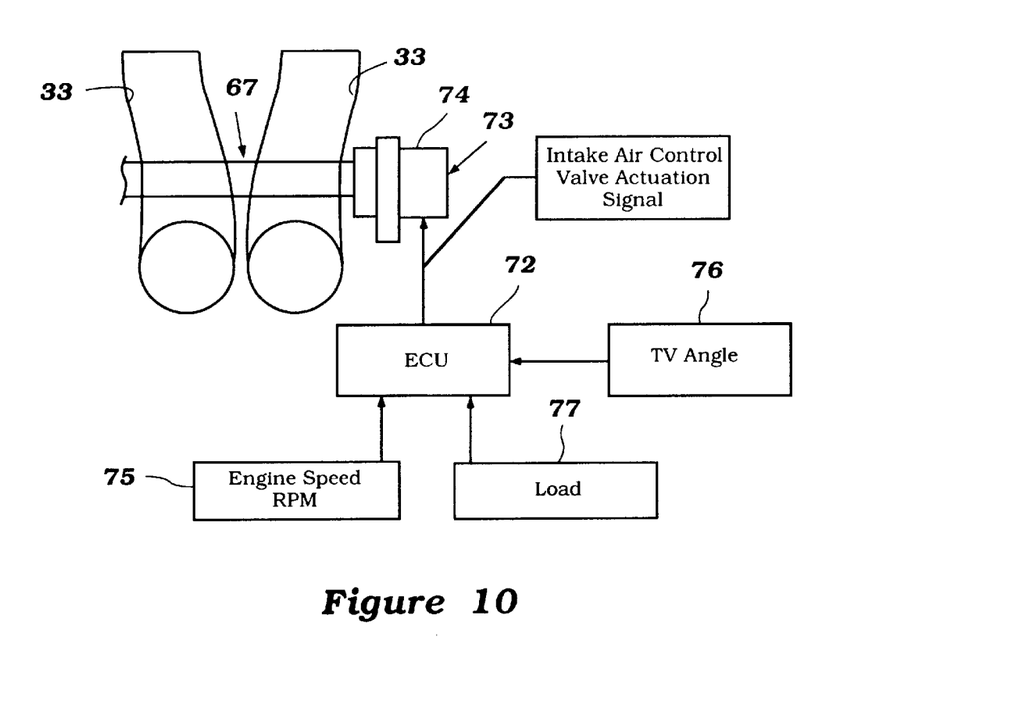
FIG. 10 is a partially schematic view showing the control elements for the tumble control valve of this embodiment.

The mechanism by which the tumble control valve 67 is operated is shown somewhat schematically in FIG. 10 and this includes an ECU, indicated generally by the reference numeral 72 which controls an actuator mechanism 73. The actuator mechanism 73 includes a stepping motor 74 and coupling mechanism that is coupled to the valve element 68 so as to effect changes in its angular position.

Certain sensed conditions are fed to the ECU 72 to provide the intake air control valve actuating signal indicated by the arrow in this figure. These include an engine speed signal delivered from sensor 75 which may be associated with the crankshaft of the engine in a well known manner. In addition, the position of the aforenoted manually operated throttle valve is indicated by a sensor 76. Finally, the load may be sensed by a suitable sensor 77 which can measure things such as air flow, intake manifold vacuum or other features that are indicative of load in addition to the position of the throttle valve. The actual control strategy will now be described.

Basically, the control strategy is such that when the engine is operating in a lower speed and lower load range condition, the tumble valve 67 is moved to the broken line position as shown in FIG. 1 so as to generate a tumble to the intake motion. At this time, the fuel injection, which constitutes a smaller amount of fuel than required under high speed/high load conditions, is initiated during the compression stroke. Thus, a relatively small fuel spray will pass into the combustion chamber through the cylinder head port 66. This charge will be then taken by the tumbling motion, shown in FIG. 1 by the arrows T and swept toward the gap 53 of the spark plug 51. Thus, when the spark plug 51 is fired, it will be ensured that a stoichiometric mixture is present at the spark gap 53. The remaining portion of the combustion chamber will be filled with a less than stoichiometric mixture or pure air.

On the other hand, as the engine speed and load increases, then more fuel will be required and also a homogeneous mixture will be demanded. Under this condition, the tumble valve 67 is moved to its open position as shown in FIG. 1 and the fuel injection is begun at a time when the intake valves are open. This is during the intake stroke. Thus, as shown in FIGS. 3, 7, 8 and 9, a portion of the fuel sprayed by the fuel injector 63 will actually impinge on the back sides 78 of the heads 36 of the intake valves 35 as shown by the droplets in FIG. 7.

Basically, the wetted area of the valves is the shaded area shown in FIG. 8. This deflection also appears in FIG. 9. Under this condition, however, there is a rapid flow of air through the intake passages 33 and since the passage portions 54 are directed at the back sides of the valve heads 37, this high velocity of air flow will pick up any deposited fuel and mix it thoroughly within the combustion chamber. Thus, a homogeneous charge can be formed under this condition.

Thus, it should be apparent from the foregoing description that this system and construction is very effective in providing a stratified charge under low speed and midrange running and a homogeneous mixture under high speed high load running. Thus, performance can be improved throughout the entire speed and load ranges as may be seen in FIGS. 11 and 12.

Figure 11:
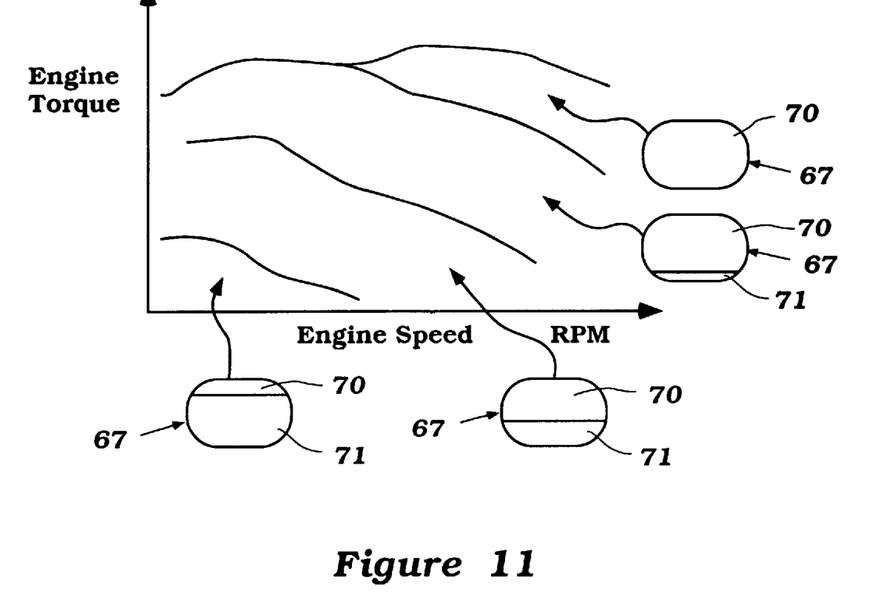
FIG. 11 is a graphical view showing the speed and torque characteristics of the engine at varying positions of the tumble valve.

FIG. 11 shows a family of torque curves that result when the tumble valve 67 is in a variety of positions. Beginning at the left-hand side of this figure, it will be seen that the valving portion 71 is substantially restricting the flow passage and the open flow area formed by the cut out 70 is substantially restricted and is directed toward the cylinder bore side so as to effect tumbling. This provides a relatively low torque under this condition but permits the achievement of the stratification.

As the load increases, the tumble valve 67 is gradually open so as to increase the free flow area 70 and reduce the restricting area 71. This improves the torque curve and this continues until the fully-open position. Thus, as stratification is not required, the amount of tumble is decreased and the fuel is distributed more fully by utilizing the deflection caused by the valve heads 36 and specifically their head portions 38.

Figure 12:
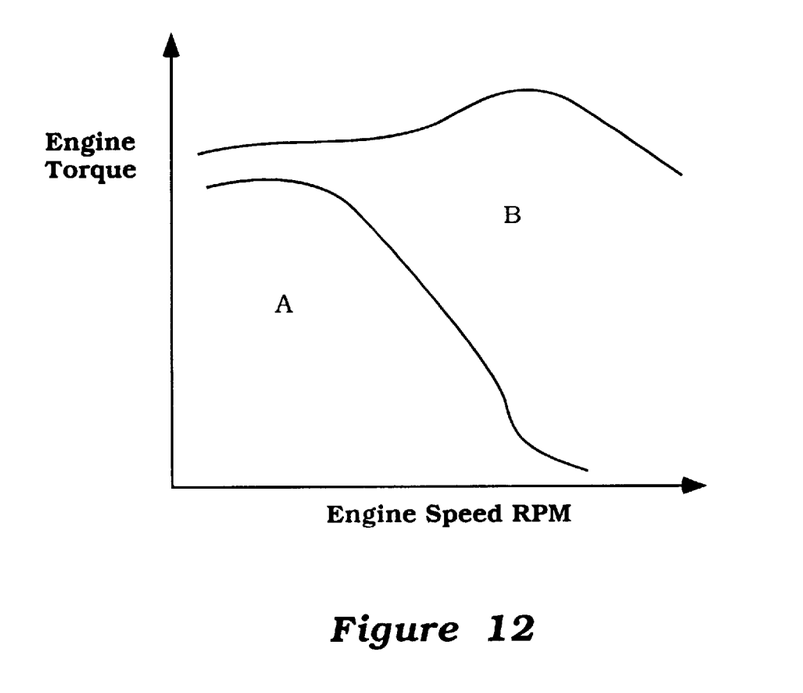
FIG. 12 is a graphical view showing the torque of the engine in relation to engine speed with the different timings of fuel injection employed.

FIG. 12 shows the effect of the fuel injection timing. The curve portion A indicates the area where the fuel is injected during the compression stroke only. As may be seen, this provides a fairly good torque curve but one which falls off rapidly as the speed increases due to the limited amount of fuel supply. Thus, the injection timing is determined by this data.

The curve portion B shows the torque which is achieved when injection takes place during the intake stroke and the intake valve is used to deflect the spray and provide a more homogenous mixture. Although this arrangement would provide better torque at lower speed, it requires a greater fuel flow and hence, the efficiency is not as good.

Figure 13:
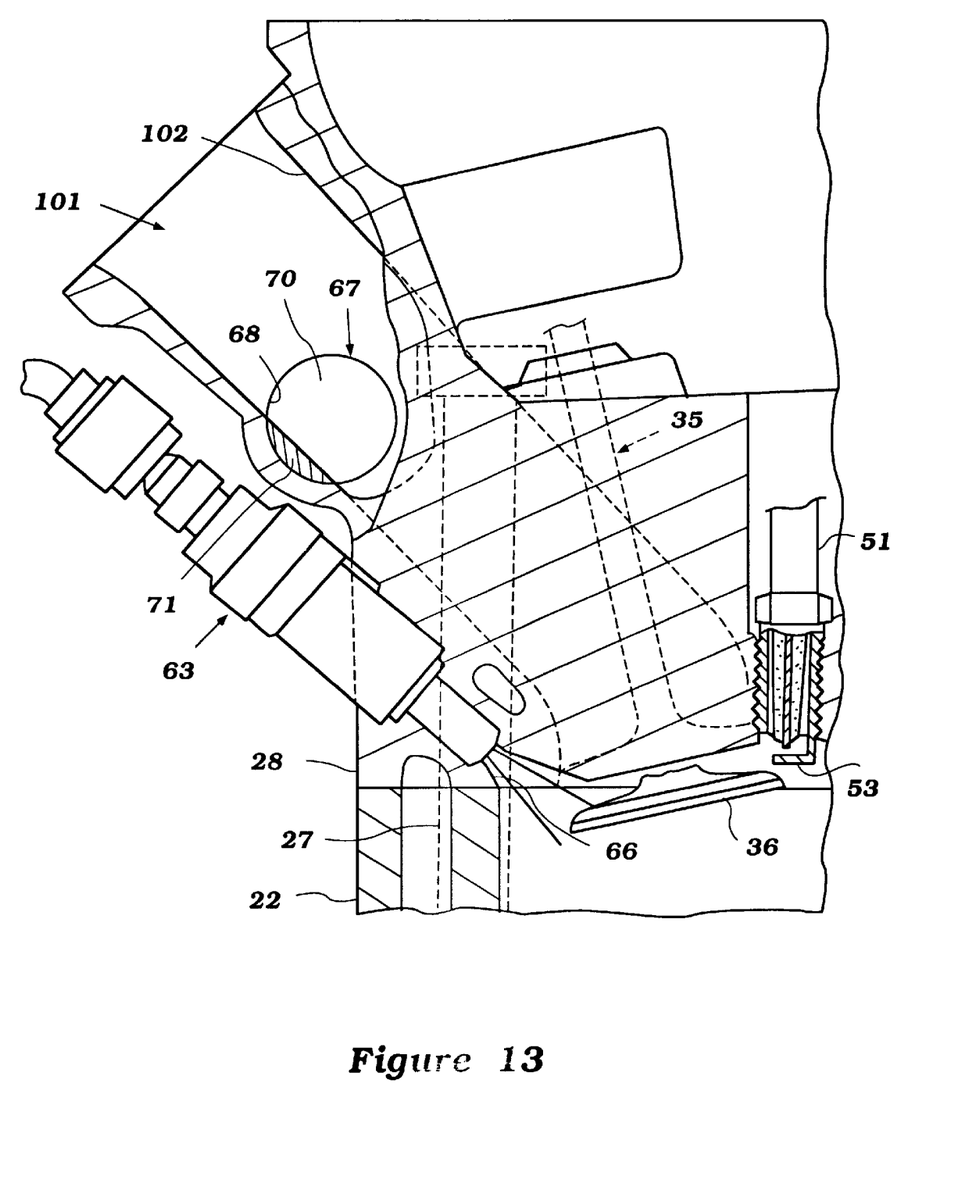
FIG. 13 is a partial cross-sectional view, in part similar to FIG. 3 and shows another embodiment of the invention.

In the embodiment as thus far described, the fuel injectors 53 are mounted in a substantially upright position between the intake passages 33. This, however, dictates the positioning of the tumble valve close to the final portion 54 of the intake passage. In some instances, it may be desirable to have the fuel spray more across the intake passage and also to move the tumble valve. FIG. 13 shows such an arrangement which dictates a lower angle for the fuel injector but permits the spray to be more across the cylinder bore.

In this embodiment, the intake passage arrangement, indicated by the reference numeral 101, is of the Siamese type having a common inlet portion 102 that splits into a pair of branch passages 103 and 104 each of which serves a respective valve seat 31. The tumble control valve 67 can thus be positioned in the common portion 102. This simplifies the valve construction.

Figure 14:
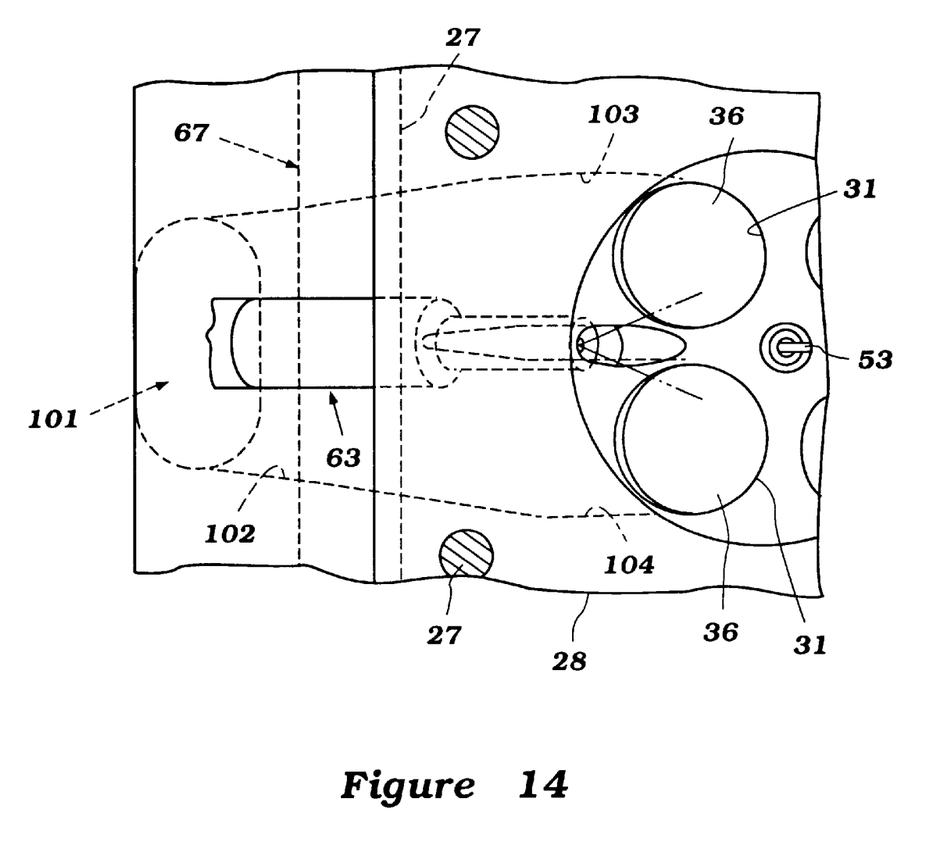
FIG. 14 is a partial bottom plan view of the cylinder head, similar to FIG. 2, but illustrating the construction of this embodiment.

Except for this difference in the component location and the induction passage arrangement, the other components are the same and the control strategy the same as that previously described. Therefore, components of this embodiment which are the same as that previously described even though located differently, have been identified by the same reference numerals. For the same reason, a further description of this embodiment is not believed to be necessary to permit those skilled in the art to practice the invention.

Thus, it should be readily apparent that the described embodiments provide an arrangement wherein stratification can be obtained rather simply under low speed and low mid-range performance and a homogeneous mixture obtained under higher speed and load requirements. This is accomplished without requiring specially configured bowls in the heads of the piston and also without requiring substantial impingement of fuel spray on the piston head.

The foregoing description is that of preferred embodiments of the invention. Various changes and modifications may be made without departing from the spirit and scope of the invention, as defined by the appended claims.

We claim:

1. A direct injected, internal combustion engine comprised of a cylinder defining a cylinder bore, a piston reciprocating in said cylinder bore, a cylinder head closing one end of said cylinder bore and forming with said piston and cylinder bore a combustion chamber, at least a pair of intake ports formed in said cylinder head substantially on one side of a plane containing the axis of said cylinder bore, said intake ports being served by an intake passage arrangement that terminates at said intake ports, a pair of intake valves for controlling the flow through said intake ports, a spark plug having its spark gap disposed substantially at the center of said combustion chamber when at its clearance volume condition, a fuel injector mounted in the area adjacent the outer periphery of said cylinder bore and having its discharge nozzle disposed at the side of said intake ports for directly injecting fuel into said combustion chamber, and means for diverting the fuel sprayed by said fuel injector toward said spark plug gap at the time of firing in a stratified relation under at least one engine running condition and for directing the fuel spray under high speed, high load conditions to achieve a homogeneous mixture in said combustion chamber at the time said spark plug is fired.

2. A direct injected, internal combustion engine as set forth in claim 1, wherein the means for directing the fuel spray toward the spark plug gap is substantially independently of the configuration of the head of the piston.

3. A direct injected, internal combustion engine as set forth in claim 1, wherein the means for directing the fuel spray is comprised principally of the opening of the fuel injector and its location, the opening and closing of the intake valves and the configuration of the intake passages.

4. A direct injected, internal combustion engine as set forth in claim 3, wherein the means for directing the fuel spray includes means for directing the fuel spray toward the intake valves when they are in an open condition.

5. A direct injected, internal combustion engine as set forth in claim 4, wherein the fuel spray is directed toward the intake valves on the intake stroke.

6. A direct injected, internal combustion engine as set forth in claim 3, wherein the means for directing the fuel spray comprises means for effecting a tumbling motion in the combustion chamber and injecting the fuel in a time when it will be swept by the tumbling motion toward the spark gap at the time of firing.

7. A direct injected, internal combustion engine as set forth in claim 1, wherein the fuel injector is mounted in the cylinder head in the area transversely between the intake ports.

8. A direct injected, internal combustion engine as set forth in claim 7, wherein the means for directing the fuel spray toward the spark plug gap is substantially independently of the configuration of the head of the piston.

9. A direct injected, internal combustion engine as set forth in claim 7, wherein the means for directing the fuel spray is comprised principally of the opening of the fuel injector and its location, the opening and closing of the intake valves and the configuration of the intake passages.

10. A direct injected, internal combustion engine as set forth in claim 9, wherein the means for directing the fuel spray includes means for directing the fuel spray toward the intake valves when they are in an open condition.

11. A direct injected, internal combustion engine as set forth in claim 10, wherein the fuel spray is directed toward the intake valves on the intake stroke.

12. A direct injected, internal combustion engine as set forth in claim 1, wherein the at least one running condition comprises lower speeds and loads.

13. A direct injected, internal combustion engine as set forth in claim 1, wherein the means for directing the fuel spray under high speed, high load conditions includes means for directing the fuel spray toward the intake valves when they are in an open condition.

14. A direct injected, internal combustion engine as set forth in claim 13, wherein the fuel spray is directed toward the intake valves on the intake stroke.

15. A direct injected, internal combustion engine as set forth in claim 1, wherein the intake passage arrangement comprises a Siamesed intake passage.

16. A direct injected, internal combustion engine as set forth in claim 15, wherein the means for directing the fuel spray comprises means for effecting a tumbling motion in the combustion chamber and injecting the fuel in a time when it will be swept by the tumbling motion toward the spark gap at the time of firing.

17. A direct injected, internal combustion engine as set forth in claim 16, further including a tumble valve in the common part of the Siamesed intake passage for directing the flow of intake charge in a tumbling motion.

18. A direct injected, internal combustion engine comprised of a cylinder defining a cylinder bore, a piston reciprocating in said cylinder bore, a cylinder head closing one end of said cylinder bore and forming with said piston and cylinder bore a combustion chamber, at least a pair of intake ports formed in said cylinder head substantially on one side of a plane containing the axis of said cylinder bore, said intake ports being served by an intake passage arrangement that terminates at said intake ports, a pair of intake valves for controlling the flow through said intake ports, a spark plug having its spark gap disposed substantially at the center of said combustion chamber when at its clearance volume condition, a fuel injector mounted in the area adjacent the outer periphery of said cylinder bore and having its discharge nozzle disposed at the side of said intake ports for directly injecting fuel into said combustion chamber, and means for diverting the fuel sprayed by said fuel injector toward said spark plug gap at the time of firing by effecting a tumbling motion in the combustion chamber and injecting the fuel in a time when it will be swept by the tumbling motion toward the spark gap at the time of firing, said tumbling motion being effected by a tumble valve in said intake passage for directing the flow of intake charge in a tumbling motion.

19. A direct injected, internal combustion engine as set forth in claim 18, wherein the tumbling motion is generated at lower speeds and loads.

20. A direct injected, internal combustion engine as set forth in claim 19, wherein the means for directing the fuel spray provides a different arrangement for directing the fuel spray under high speed, high load conditions to achieve a homogeneous mixture in the combustion chamber at the time the spark plug is fired.

21. A direct injected, internal combustion engine as set forth in claim 20, wherein the means for directing the fuel spray under high speed, high load conditions includes means for directing the fuel spray toward the intake valves when they are in an open condition.

22. A direct injected, internal combustion engine as set forth in claim 21, wherein the fuel spray is directed toward the intake valves on the intake stroke.

23. A direct injected, internal combustion engine as set forth in claim 18, wherein the fuel injector is mounted in the cylinder head in the area transversely between the intake ports.

24. A direct injected, internal combustion engine as set forth in claim 23, wherein the intake passage arrangement comprises a separate intake passage serving each of the intake ports.

25. A direct injected, internal combustion engine as set forth in claim 24, wherein the fuel injector is positioned at least in part between the intake passages.

26. A direct injected, internal combustion engine as set forth in claim 25, wherein the means for directing the fuel spray comprises means for effecting a tumbling motion in the combustion chamber and injecting the fuel in a time when it will be swept by the tumbling motion toward the spark gap at the time of firing.

27. A direct injected, internal combustion engine as set forth in claim 26, further including a tumble valve in the intake passage for directing the flow of intake charge in a tumbling motion.

\* \* \* \* \*